United States Patent
Bahl et al.

(10) Patent No.: US 10,348,828 B2
(45) Date of Patent: Jul. 9, 2019

(54) METHOD AND APPARATUS FOR OPTIMIZING DATA TRANSFERS UTILIZING MACHINE LEARNING

(71) Applicant: CISCO TECHNOLOGY, INC., San Jose, CA (US)

(72) Inventors: Rohit Bahl, Kanata (CA); Stephen Williams, Stittsville (CA); Harsh Parandekar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 212 days.

(21) Appl. No.: 15/187,594

(22) Filed: Jun. 20, 2016

(65) Prior Publication Data

US 2017/0366611 A1    Dec. 21, 2017

(51) Int. Cl.
*G06F 15/16* (2006.01)
*H04L 29/08* (2006.01)
*G06N 20/00* (2019.01)
*H04L 12/24* (2006.01)
*H04L 12/26* (2006.01)

(52) U.S. Cl.
CPC ......... *H04L 67/1097* (2013.01); *G06N 20/00* (2019.01); *H04L 41/16* (2013.01); *H04L 43/0852* (2013.01); *H04L 43/16* (2013.01); *H04L 67/325* (2013.01)

(58) Field of Classification Search
CPC ... H04L 67/148; H04L 67/1097; H04L 41/12; H04L 43/08; G06N 99/005
USPC ....................................................... 709/217
See application file for complete search history.

(56) References Cited

U.S. PATENT DOCUMENTS

| | | | | |
|---|---|---|---|---|
| 6,085,251 A * | 7/2000 | Fabozzi, II | ............. | H04L 29/06 709/203 |
| 7,546,363 B2 * | 6/2009 | Harrow | ................... | H04L 47/10 709/217 |
| 7,562,112 B2 * | 7/2009 | Harrow | ................... | H04L 47/10 709/203 |
| 7,839,788 B2 * | 11/2010 | Qi | .......................... | H04L 45/24 370/235 |
| 8,209,711 B2 * | 6/2012 | Walsh | ..................... | H04L 69/28 709/203 |
| 2002/0194325 A1 * | 12/2002 | Chmaytelli | ............. | H04L 67/34 709/224 |

(Continued)

OTHER PUBLICATIONS https://www.getfilecloud.com/.
http://www.juniper.net/techpubs/en_US/contrail2.0/topics/task/configuration/storage-support-vnc.html.

*Primary Examiner* — Imad Hussain
(74) *Attorney, Agent, or Firm* — Cindy Kaplan (57) ABSTRACT

In one embodiment, a method includes receiving at a network device comprising a data transfer optimization module, input identifying a source directory comprising data and a target directory at a storage device, splitting the data into a plurality of data groups for transfer to the storage device, transmitting the data groups concurrently to the storage device on data paths wherein transfer times of the data groups are monitored, receiving at the data transfer optimization module, identification of a data group with a longest transfer time, splitting the data group with the longest transfer time, and placing the data from the data group into at least two of the data groups for transfer to the storage device. An apparatus and logic are also disclosed herein.

20 Claims, 4 Drawing Sheets

(56) References Cited

U.S. PATENT DOCUMENTS

| | | | |
|---|---|---|---|
| 2003/0009518 A1* | 1/2003 | Harrow | H04L 47/10 709/203 |
| 2003/0009586 A1* | 1/2003 | Harrow | H04L 47/10 709/238 |
| 2003/0018712 A1* | 1/2003 | Harrow | H04L 47/10 709/203 |
| 2003/0074379 A1* | 4/2003 | Keohane | H04L 67/06 |
| 2004/0172476 A1* | 9/2004 | Chapweske | H04L 29/06 709/231 |
| 2006/0031537 A1* | 2/2006 | Boutboul | H04L 67/10 709/228 |
| 2008/0104170 A1* | 5/2008 | Ananthanarayanan | H04L 67/06 709/204 |
| 2009/0083432 A1* | 3/2009 | Saito | H04L 47/10 709/231 |
| 2010/0049795 A1 | 2/2010 | Tock et al. | |
| 2011/0137915 A1 | 6/2011 | Bahl et al. | |
| 2011/0231365 A1 | 9/2011 | Bahl et al. | |
| 2013/0262659 A1* | 10/2013 | Parthasarathy | H04L 41/5083 709/224 |
| 2014/0149557 A1* | 5/2014 | Lohmar | H04L 65/605 709/219 |
| 2014/0195596 A1* | 7/2014 | Yamasaki | H04L 29/08801 709/203 |
| 2015/0156174 A1* | 6/2015 | Fahey | H04L 63/0428 713/168 |
| 2015/0339197 A1 | 11/2015 | Kavuri et al. | |
| 2017/0171319 A1* | 6/2017 | Hall | H04L 67/141 |

\* cited by examiner

METHOD AND APPARATUS FOR OPTIMIZING DATA TRANSFERS UTILIZING MACHINE LEARNING

TECHNICAL FIELD

The present disclosure relates generally to communication networks, and more particularly, to optimizing data transfers in a communication network.

BACKGROUND

As the size of data transfers continues to grow, time and resources needed to perform file system based data transfers increases. Large data transfers may impact downstream activity, including for example, non-availability of linked based tree publishing as well as tying up build servers from servicing additional requests.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving at a network device comprising a data transfer optimization module, input identifying a source directory comprising data and a target directory at a storage device, splitting the data into a plurality of data groups for transfer to the storage device, transmitting the data groups concurrently to the storage device on data paths wherein transfer times of the data groups are monitored, receiving at the data transfer optimization module, identification of a data group with a longest transfer time, splitting the data group with the longest transfer time, and placing the data from the data group into at least two of the data groups for transfer to the storage device.

In another embodiment, an apparatus generally comprises a learning client module for receiving input identifying a source directory comprising data and a target directory at a storage device, splitting the data into a plurality of data groups for transfer from the apparatus to the storage device, receiving information identifying a data group with a longest transfer time, splitting the data group with the longest transfer time, and placing the data from the data group into at least two of the data groups for transfer to the storage device. The apparatus further comprises a plurality of interfaces for transmitting the data groups concurrently from the apparatus to the storage device on data paths wherein transfer times of the data groups are monitored.

In yet another embodiment, logic is encoded on one or more non-transitory computer readable media for execution and when executed operable to process input identifying a source directory comprising data at a server and a target directory at a storage device, split the data into a plurality of data groups for transfer from the server to the storage device, transmit the data groups concurrently from the server to the storage device on data paths wherein transfer times of the data groups are monitored, process information identifying a data group with a longest transfer time, split the data group with the longest transfer time, and place the data from the data group into at least two of the data groups for transfer to the storage device.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Transfer of large volumes of data stored on a file system may take extended periods of time. Large data transfers may involve, for example, build trees (directories) that contain millions of artifacts and are over half of a terabyte in size. Transferring each build tree from the node where the build occurred to a file system may take upwards of ten hours, for example. These data characteristics are only examples of large data transfers and the same issues, including negative impact on downstream resources, may result from smaller data transfers taking less time, and larger data transfers taking more time may have even more of an impact on resource availability.

The embodiments described herein provide machine learning trained, subtree splitting of a rooted source tree for concurrent archival. In one or more embodiments this may include classification of source trees that are attributed with unbalanced containment hierarchy structure and association of this and other characteristics with metrics such as transfer completion time. Performance metrics may be used to split similarly categorized source trees in a breadth first, top down manner, for example. In some embodiments, numerically exceeding containment hierarchy splits to deeper depths may extend beyond a directed concurrency limit, contingent to the increase being within a configurable threshold. The embodiments may provide faster concurrent data transfers, without the need to calculate the size of subtrees and nested subtrees ahead of time in order to determine how to split the data. Concurrent data transfers may be dynamically tuned automatically based on source characteristics. The embodiments may be used, for example, for periodic replication of data utilizing software to facilitate repeated file transfers or any other repeated data transfer that can benefit from optimization to reduce transfer time.

Figure 1:
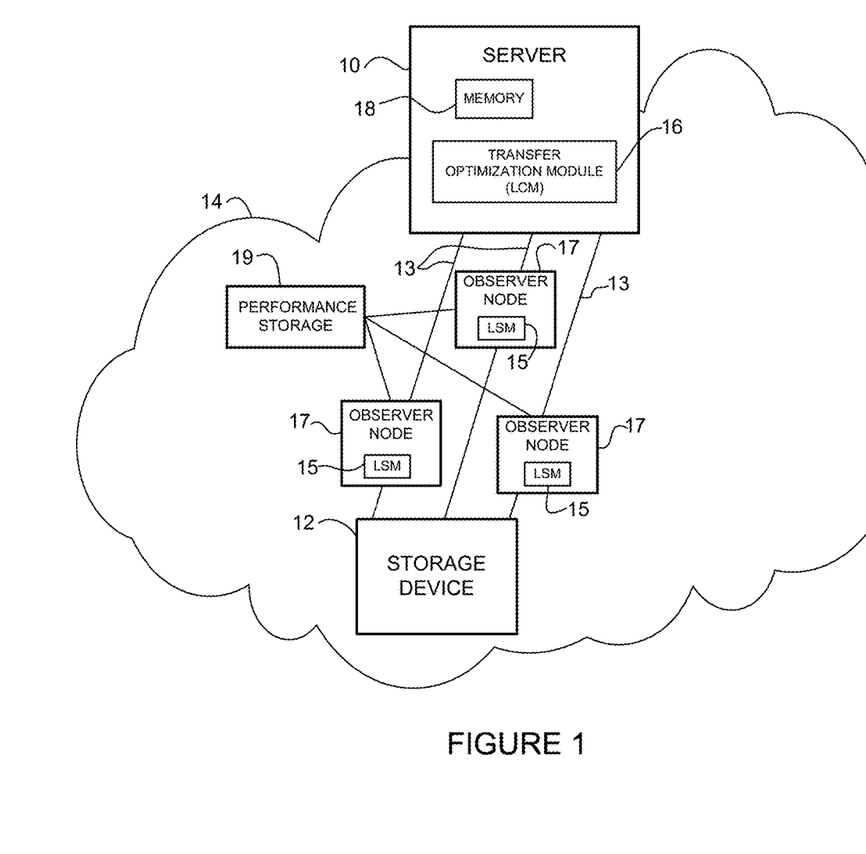
FIG. 1 illustrates an example of a network in which embodiments described herein may be implemented.

Referring now to the drawings, and first to FIG. 1, an example of a network in which embodiments described herein may be implemented is shown. The embodiments operate in the context of a data communication network including multiple network devices (components, elements, nodes). For simplification, only a small number of network devices and data paths are shown. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the example shown in FIG. 1, a server 10 and storage device 12 are in communication over a network 14 via a plurality of data paths 13. As described in detail below, the embodiments provide for optimized transfer of data from the server 10 to the storage device 12. The data transfer may traverse one or more networks 14. Data flow paths 13 between the server 10 and storage device 12 may include any number or type of intermediate nodes (e.g., routers, switches, gateways, or other network devices) and communication links. In one embodiment, each data path 13 passes through an observer node 17 operable to monitor data transfers from the server 10 to the storage device 12. The example shown in FIG. 1 comprises three data paths 13 interposed between the sever 10 and storage device 12, however, there may be any number of communication paths (ports, links) for use in transferring data from the server to the storage device. As described below, the number of data paths 13 between the server 10 and storage device 12 may be associated with a seed value indicating a number of diverse data paths on which the server can concurrently transfer data to the storage device.

The storage device (target, destination) 12 may comprise, for example, an NFS (Network File System) storage filer or any other network device comprising memory and using any type of file-based protocol. The storage device 12 may receive data fragments (chunks) in parallel over multiple communication channels 13. The storage operations may be performed according to a storage policy (e.g., preferences or criteria for performing storage operations). The preferences may include, for example, storage location, schedule (time or interval), data retention, compression, encryption, data transfer paths, etc. The storage device 12 may receive and archive data from any number of servers 10 and comprise any amount or type of storage (memory). The data may be retained in memory at the storage device 12 temporarily (e.g., until updated with new data) or retained for any period of time.

The server (build server, network device) 10 may transfer data to any number of storage devices 12. For example, the server 10 may be in communication with two or more redundant storage devices or any number of storage devices for use in storing data from different source directories. The data may be transferred from the server to the storage device based on periodic replication of data utilizing software to facilitate repeated file transfers. The server 10 may be a stand-alone device or a group of devices (e.g., server cluster) comprising memory 18 for storing data (e.g., artifacts, fragments, subtrees, files) in a source directory. The build server 10 may have associated therewith a local disk containing built artifacts. In one example, memory (e.g., hard drive) may provide files to a build application, which automatically builds a data tree and persists the information to the local memory. The resulting rooted build tree may span, for example, approximately half a terabyte in storage space, with an unbalanced hierarchy structure comprising millions of files. It is to be understood that these are only examples and that the embodiments described herein may be implemented for optimizing data transfers for any size source directory comprising any number of files or artifacts.

The data transferred from the server 10 to the storage device 12 may comprise any type or amount of data, including for example, encrypted data, compressed data, streaming data, audio, video, text, image, or any other type of data comprising any type of format or encoding, number of artifacts, or requiring any storage size. The data may comprise, for example, file updates, application updates, network data, application data, files for storage at a content server, or any other type of data, files, content, etc. that may be transferred to the storage device for archive.

The server 10 further comprises a transfer optimization module (also referred to herein as a Learning Client Module (LCM)) 16. The LCM 16 may drive the actual task of transferring fragments (subtrees) of the rooted directory (e.g., initiate transfer task). In one embodiment, the LCM 16 is configured to receive feedback from the observer nodes 17 for use in optimizing future file transfers based on machine learning. In the example shown in FIG. 1, the transfer optimization module 16 resides at the server 10, however, the module may run on another network device in communication with the server.

As described in detail below, the system may use machine learning to optimize data transfers, thereby reducing the time needed for data transfer. Machine learning is an area of computer science in which the goal is to develop models using example observations (training data), that can be used to make predictions on new observations. The system may use data transfer times as training data for use in subtree splitting. For example, the LCM 16 may be configured to split an unbalanced rooted directory into sub-fragments based on machine learning. The experience aspect of a learning machine may be executed by the LCM, whereby the experience constitutes splitting up the unbalanced rooted directory in sub-fragments (data groups). The LCM 16 may execute as a process (though in turn it may fork multiple processes) that is invoked on the build server 10.

In one embodiment, the observer nodes 17 comprise Learning Server Modules (LSMs) 15 operable to observe the performance aspect of the concurrent transfer tasks by monitoring the transfer of data from the server 10 to the storage device 12. The LSM 15 may, for example, identify an initial time $T_1$ associated with a data group (subtree, fragments) and a final time $T_2$ at which data transfer for the data group is completed. The transfer time may then be identified as $T_2$-$T_1$. The LSM 15 may store performance metrics associated with the transfer times along with classification characteristics (e.g., branch (subtree, group), build type, images to be produced, etc.) as well as the subtrees participating. The LSMs 15 observe the performance aspect of the concurrent transfer tasks and provide for further improvements to the LCM 16 for the splitting experience in order to improve the transfer task's performance. The LSMs 15 provide feedback to the transfer optimization module 16 for use in determining how to optimally split the data for transfer, as described in detail below.

The LSMs 15 reside on hosts separate from where the source artifacts are residing and assist in the task of the concurrent transfer that was initiated by the LCM module 16. In the example shown in FIG. 1, each communication path used to transfer data from the server 10 to the storage device 12 comprises an observer node 17. In another example, one observer node 17 may monitor data on two or more data paths 13 used to transfer data to the storage device.

In one embodiment, the system further includes performance storage 19 for storing performance metrics for the tasks. The performance storage 19 interfaces with the LSMs 15 that both query and store machine learning information. The performance storage 19 may, for example, maintain performance metrics for the tasks, which may be classified and categorized based on characteristics. Additionally, the performance storage 19 may store a list of recommendations that act as optimizations that are associated with the characteristics. The performance storage device 19 may collect performance metrics from the observer nodes 17 and provide the metrics to one or more of the observer nodes, which in turn provide the metrics or recommendations based on the metrics to the LCM 16. The performance storage 19 may operate at a network device in communication with the observer nodes 17 or may be distributed among any number of nodes, including one or more of the observer nodes.

It is to be understood that the network shown in FIG. 1 and described above is only an example and the embodiments described herein may be implemented in networks comprising different network topologies or network devices without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of core networks. Moreover, the topology illustrated in FIG. 1 and described above is readily scalable and may accommodate a large number of components, as well as more complicated arrangements and configurations. For example, there may be any number of data paths (links, ports) for concurrent transfer of data between the server 10 and storage device 12, any number of observer nodes 17, and any number of servers in communication with the storage device or storage devices in communication with the server. Network nodes (elements, devices) may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communication.

Figure 2:
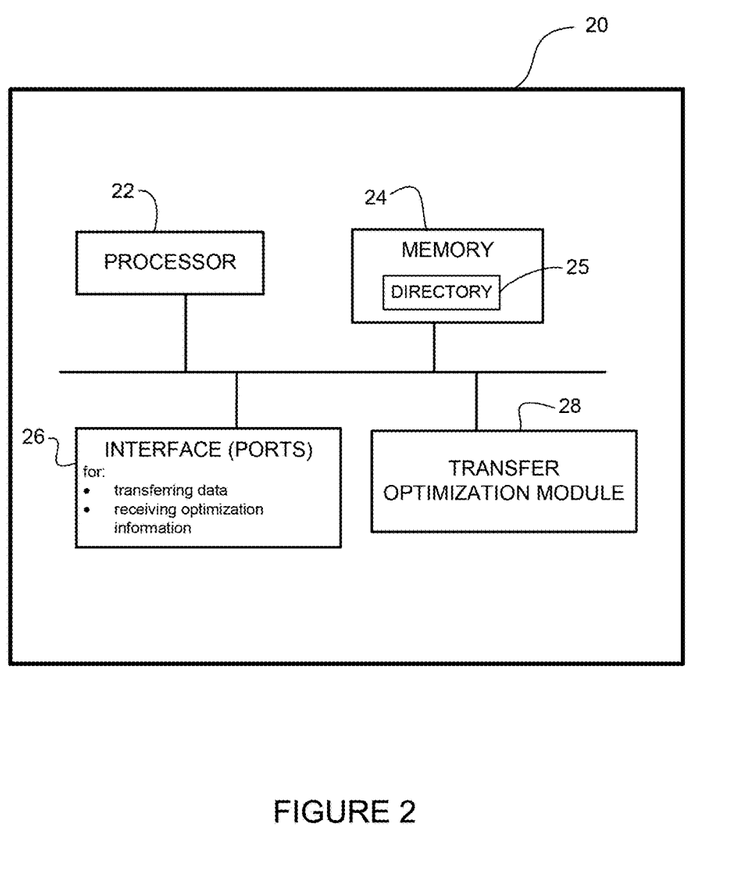
FIG. 2 depicts an example of a network device useful in implementing embodiments described herein.

FIG. 2 illustrates an example of a network device 20 (e.g., server 10 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and transfer optimization module 28 (e.g., logic, software, firmware).

Memory 24 may be a volatile memory or non-volatile storage, which stores various applications, operating systems, modules, and data for execution and use by the processor 22. For example, components of transfer optimization module 28 (e.g., module, code, logic, software, firmware, etc.) may be stored in memory 24. Memory 24 may also include one or more directories (source directory, source tree) 25. The network device 20 may include any number of memory components.

Logic may be encoded in one or more tangible media for execution by the processor 22. For example, the processor 22 may execute codes stored in a computer-readable medium such as memory 24 to perform the processes described below with respect to FIGS. 3 and 4. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium.

The network interface 26 may comprise any number of interfaces (linecards, ports) for receiving data or transmitting data to other devices. For example, the network interface 26 may comprise a plurality of ports for concurrently transferring data from the server 10 to the storage device 12. The network interface 26 may be configured to transmit or receive data using a variety of different communication protocols. The network interface 26 may include, for example, an Ethernet interface for connection to a computer or network. The interface may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, processors, devices, components, modules, or elements operable to facilitate the capabilities described herein.

Figure 3:
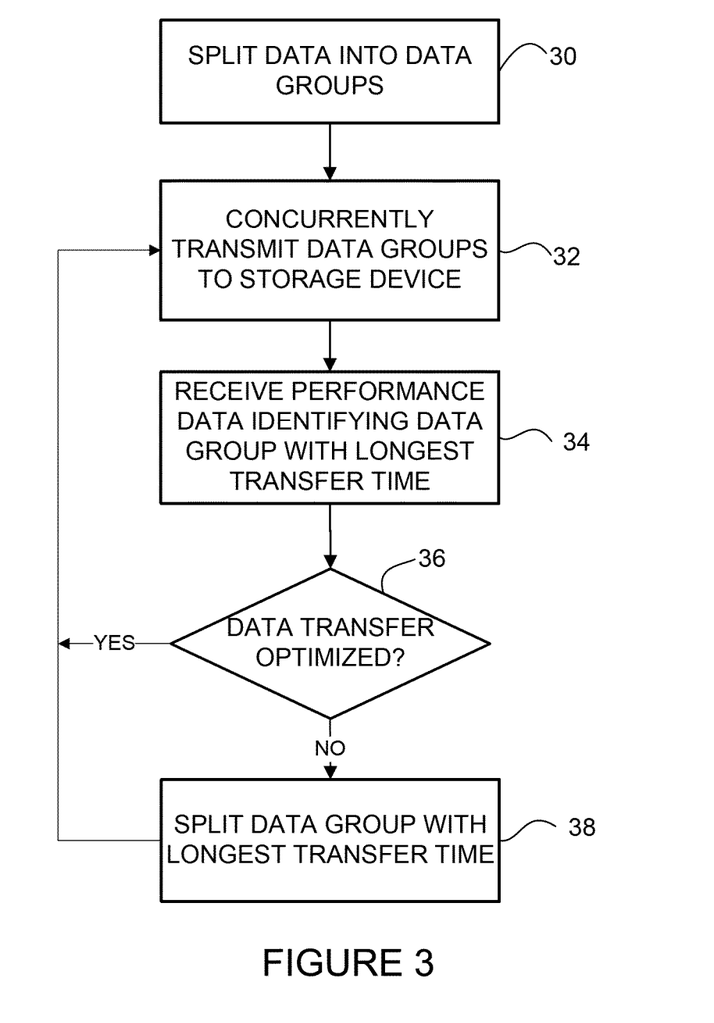
FIG. 3 is a flowchart illustrating an overview of a process for optimizing data transfers utilizing machine learning, in accordance with one embodiment.

FIG. 3 is a flowchart illustrating an overview of a process for optimization of data transfer, in accordance with one embodiment. The LCM (data transfer optimization module) 16 is initially invoked with input (e.g., source build tree, target destination, and advisory seed value for concurrency). In an untrained environment, this seed value may be used by the LCM 16 to do a breadth first, top down traversal, splitting the unbalanced tree into subtrees numbering less than or equal to the seed value. In a non-governed mode, the number of concurrent transfers may exceed the seed value if splitting to a greater depth does not cause the delta to be significantly larger than the directed seed value.

At step 30, the transfer optimization module (LCM) 16 determines the number of groups (subtrees) to split the data into based on the seed value, available ports, or other input and splits the data into data groups (FIGS. 1 and 3). The data may be split into groups based on the hierarchy of the directory (e.g., one or more subdirectories (subtrees) placed into each group, loose files placed into a group or placed throughout other groups). The transfer task is then conducted in parallel for each of these groups (subtrees) with the cooperation of one or more LSMs 15 (step 32).

Each LSM 15 monitors the transfer task and identifies transfer times for each group. In one embodiment, the transfer times of fragments (subtrees, groups) greater than a particular threshold are captured at the LSM 15. The LSM 15 may store these metrics alongside classification characteristics as well as the subtrees (group) participating.

The LCM 16 receives performance data identifying the data group with the longest transfer time from the LSM 15 (step 34). In one example, the LCM 16 may reach out to the LSM (or LSMs) 15, which may in turn ask persistence storage which subtree (group) to split further for improved transfer times. Each LSM 15 may respond to the LCM 16 based on its own data monitoring or on behalf of some or all of the other LSMs based on input from the performance storage 19. For a project with particular characteristics, the LSM 15 may respond back to the LCM 16 as to which group is taking the longest time to transfer, allowing it to be parallelized further. If one data group has a transfer time greater than the other data groups, the data transfer may be further optimized (step 36). The group with the longest running data transfer is then subdivided and further parallelized, causing transfers to complete quicker (step 38). Steps 32, 34, and 38 may be repeated any number of times and at any interval, and each time the data transfer time may be optimized to further reduce transfer times based on machine learning. For example, splitting of the data group with the longest transfer time may continue until the longest transfer time is sufficiently close to transfer times for the other data groups, which indicates that the data transfer is optimized (step 36).

It is to be understood that the process shown in FIG. 3 and described above is only an example and that steps may be added, deleted, combined, or modified without departing from the scope of the embodiments.

Figure 4:
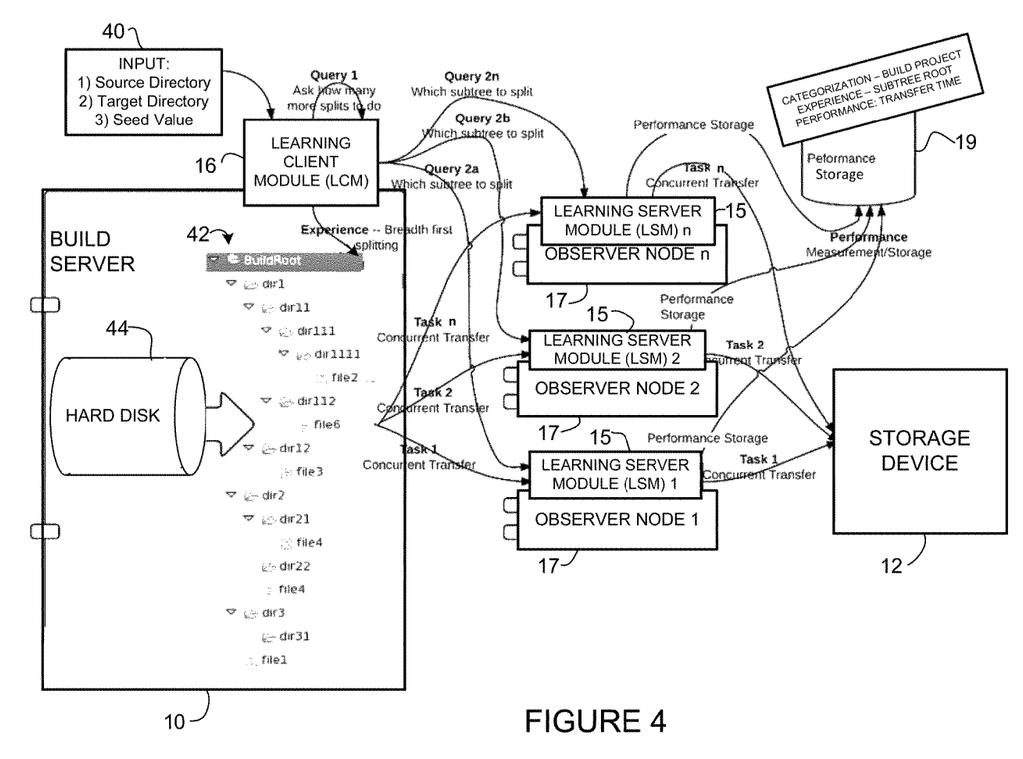
FIG. 4 illustrates details of a data transfer optimization system shown in FIG. 1.

FIG. 4 illustrates details of the data transfer optimization process, in accordance with one embodiment. As shown in the example of FIG. 4, the build server 10 creates a data tree, generally indicated at 42. This may be performed, for example, daily or at any other periodic interval. The build tree 42 shown in FIG. 4 includes a build root and subdirectories, dir1, dir2, and dir3, each subdirectory comprising further subtrees (e.g., dir11, dir111, dir1111, dir112, and dir12 under dir1, dir21 and dir22 under dir2, and dir31 under dir3). There may also be any number of files under each directory (e.g., file2 under dir1111, file6 under dir112, file3 under dir12, file4 under dir21 and dir22, and file1 under the root node). It is to be understood that the data tree shown in FIG. 4 is only an example and that the directory may comprise any type or amount of data arranged in any hierarchy, tree, or other arrangement. At some point after the tree is built, the archival step is executed to store the data generated by the build server 10.

As previously described, the LCM 16 receives input 40 (e.g., from network administrator), which identifies the source directory 42, target directory at storage device 12, and seed value. The source directory input may identify, for example, a directory at the local hard disk 44 (/BuildRoot), the target directory may comprise a NetApp filer (/auto/BuildStore/), and the seed value may indicate a limit or advisory value for the number of concurrent transfers (e.g., four in this example). For simplification, only three concurrent transfers (task 1, task 2, and task n) are shown in FIG. 4.

In an untrained scenario the LCM 16 may reach out to the LSMs 15 and inquire as to which principal fragments to further split. Since at this point in time the system is untrained, no recommendations are returned. The LCM 16 may then start to split the data into subdirectories in a breadth first fashion, until it exceeds the limit of four (based on Query 1). In this example, the data is split into four groups: group 1 (dir1); group 2 (dir2); group 3 (dir3); and group 4 (all loose files (e.g., file 1), as shown in Table I below. In a non-governed mode, assuming the system was configured at a threshold of 25% tolerance, the LCM 16 may attempt to further split the data until it reaches a limit of five groups (fragments). Thus, in some embodiments, the LCM 16 itself may attempt local optimization (without including the LSM 15) by treating the seed value as an advisory instead of a hard rule by doing a cost benefit analysis.

TABLE I

| GROUP 1 | GROUP 2 | GROUP 3 | GROUP 4 |
|---------|---------|---------|---------|
| dir1    | dir2    | dir3    | loose files |

The LSMs 15 confirm supporting the concurrency requested and accordingly assist in the transfer of files acting as conduits. The LCM 16 starts the transfer via the LSMs 15 to the target location, in this case, /auto/BuildStore/BuildRoot/. Each of the fragments arrives at separate intervals of time to /auto/BuildStore/BuildRoot/. On completion of the data transfer, the LSM 15 persists details, such as fragments participating, (e.g., dir1 (group 1), dir2 (group 2), dir3 (group 3) and the loose files (group 4)) and their associated times. Additionally, the characteristics associated with the categorization for this transfer may be applied and persisted in the performance storage 19.

Once the LCM 16 receives feedback from the LSMs 15 (Query 2a, Query 2b, Query 2n), the system is now trained. During the first transfer in this example, group 1 comprising dir1 took the longest to transfer. At the next build time (e.g., next night or any other periodic interval), the build process is executed on the build server 10. Based on the information provided by the LSM 15 for this directory, optimization involves splitting on group 1 (dir1), which was the slowest transfer. Consequently, dir11 and dir12 each serve as fragments in their own right and are transferred concurrently, instead of cumulatively with the rest of dir1, as shown in Table II below. The remnants of files in dir1 are put in group 4, which was used for transferring loose files in the previous transfer. In this example, the LCM 16 operates in non-governed mode and the seed value is used as an advisory value rather than a limit. The LCM 16 splits the data until it reaches a limit of five groups.

TABLE II

| GROUP 1 | GROUP 2 | GROUP 3 | GROUP 4 | GROUP 5 |
|---------|---------|---------|---------|---------|
| dir11   | dir2    | dir3    | loose files remaining files in dir1 | dir12 |

The data transfer is performed from the server 10 to the storage device 12 based on the new optimization. For this second transfer, dir12 completed quickly but dir11 continued to show a greater lag for time to completion. Now the system is even better trained. Based on feedback from the LSMs 15, the LCM 16 splits dir11 on the next data transfer.

For the third data transfer, the system reverts back to transferring dir1 in its own fragment, with the exclusion of dir11 which is instead split into dir111 and dir112, as shown in Table III below. Each of these fragments dir111 and dir112 has their own fragment transfer.

TABLE III

| GROUP 1 | GROUP 2 | GROUP 3 | GROUP 4 | GROUP 5 |
|---------|---------|---------|---------|---------|
| dir111  | dir2    | dir3    | loose files dir1 (except dir11) | dir112 |

The above process continues until the successive transfer of multiple fragments start to complete in time relatively close to one another (e.g., transfer time for groups 1, 2, 3, 4, and 5 generally the same).

As can be observed from the foregoing, the embodiments described herein provide numerous advantages. For example, the embodiments provide faster concurrent data transfers. In one experiment comparing the embodiments to other data transfer systems, an improvement in transfer times of between three and five hours was provided. One or more embodiments eliminate the need for fact finding ahead of time or calculating sizes of subtrees and nested subtrees to figure out how to split the data. The embodiments may be used to dynamically tune concurrency based on source characteristics.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a network device comprising a data transfer optimization module, input identifying a source directory comprising data and a target directory at a storage device;
   splitting said data into a plurality of data groups at the data transfer optimization module for transfer to the storage device;
   transmitting the data groups concurrently to the storage device on data paths wherein completed transfer times of the data groups are monitored at one or more nodes located within one or more of the data paths;
   receiving at the data transfer optimization module, identification of a data group with a longest transfer time; and
   splitting the data group with said longest transfer time at the data transfer optimization module and placing said data from the data group into at least two of the data groups for future transfer to the storage device.

2. The method of claim 1 further comprising receiving at the network device, a seed value indicating an initial number of the data groups.

3. The method of claim 2 wherein the number of the data groups may exceed said seed value for further optimization at the data transfer optimization module.

4. The method of claim 1 wherein said source directory is located at a build server and comprises a tree hierarchy with an unbalanced structure, each of the data groups associated with at least one subtree of said tree hierarchy.

5. The method of claim 1 wherein said data transfer times are monitored by at least one observer node operable to identify said transfer times for the data groups.

6. The method of claim 5 wherein the observer node comprises a learning server module operable to store performance metrics comprising said transfer times in performance storage.

7. The method of claim 6 wherein the performance storage is operable to classify and categorize said performance metrics and store optimization recommendations for the data transfer optimization module based on said transfer times.

8. The method of claim 1 further comprising repeating splitting the data group with said longest transfer time until said longest transfer time is sufficiently close to said transfer times for other of the data groups to indicate optimization of the data transfer.

9. The method of claim 1 wherein the data transfer optimization module utilizes machine learning based on performance metrics received from learning server modules within said data paths for use in optimization of periodic data transfer from the network device to the storage device, wherein said machine learning for a data build utilizes data from a previous similarly classified data build transfer.

10. An apparatus comprising:
    a processor operable to process input identifying a source directory comprising data and a target directory at a storage device, and information identifying a data group with a longest completed transfer time;
    a learning client module comprising logic encoded on one or more non-transitory computer readable media for execution and when executed operable to split said data into a plurality of data groups for transfer from the apparatus to the storage device, split the data group with said longest transfer time, and place said data from the data group into at least two of the data groups for transfer to the storage device; and
    a plurality of ports operable to transmit the data groups concurrently from the apparatus to the storage device on data paths wherein transfer times of the data groups are monitored at one or more nodes located within one or more of the data paths.

11. The apparatus of claim 10 wherein the learning client module is configured for receiving a seed value indicating an initial number of the data groups.

12. The apparatus of claim 11 wherein the number of the data groups may exceed said seed value for further optimization at the learning client module.

13. The apparatus of claim 10 wherein said source directory is located at a build server and comprises a tree with an unbalanced hierarchy structure, each subtree of the tree associated with at least one of the data groups.

14. The apparatus of claim 10 wherein said data transfer times are monitored by at least one observer node operable to identify said transfer times for the data groups.

15. The apparatus of claim 14 wherein the observer node comprises a learning server module operable to store performance metrics comprising said transfer times in storage and wherein the performance storage is operable to store optimization recommendations for the data transfer optimization module based on said transfer times.

16. The apparatus of claim 10 wherein the learning client module is further configured to repeat splitting of the data group with said longest transfer time until said longest transfer time is sufficiently close to said transfer times for other of the data groups to indicate optimization of the data transfer.

17. The apparatus of claim 10 wherein the learning client module utilizes machine learning based on performance metrics received from learning server modules within said data paths.

18. Logic encoded on one or more non-transitory computer readable media for execution and when executed operable to:
    process input identifying a source directory comprising data at a server and a target directory at a storage device;
    split said data into a plurality of data groups for transfer from the server to the storage device;
    initiate transfer of the data groups concurrently from the server to the storage device on data paths wherein completed transfer times of the data groups are monitored at one or more nodes located within one or more of the data paths;

process information identifying a data group with a longest transfer time; and split the data group with said longest transfer time and place said data from the data group into at least two of the data groups for future transfer to the storage device.

19. The logic of claim 18 further operable to create the data groups based on a seed value indicating an initial number of the data groups.

20. The logic of claim 18 wherein said data transfer times are monitored by at least one observer node operable to identify a transfer time for each of data groups, the observer node comprising a learning server module operable to store performance metrics comprising said transfer times in performance storage.

* * * * *